Figure 1:
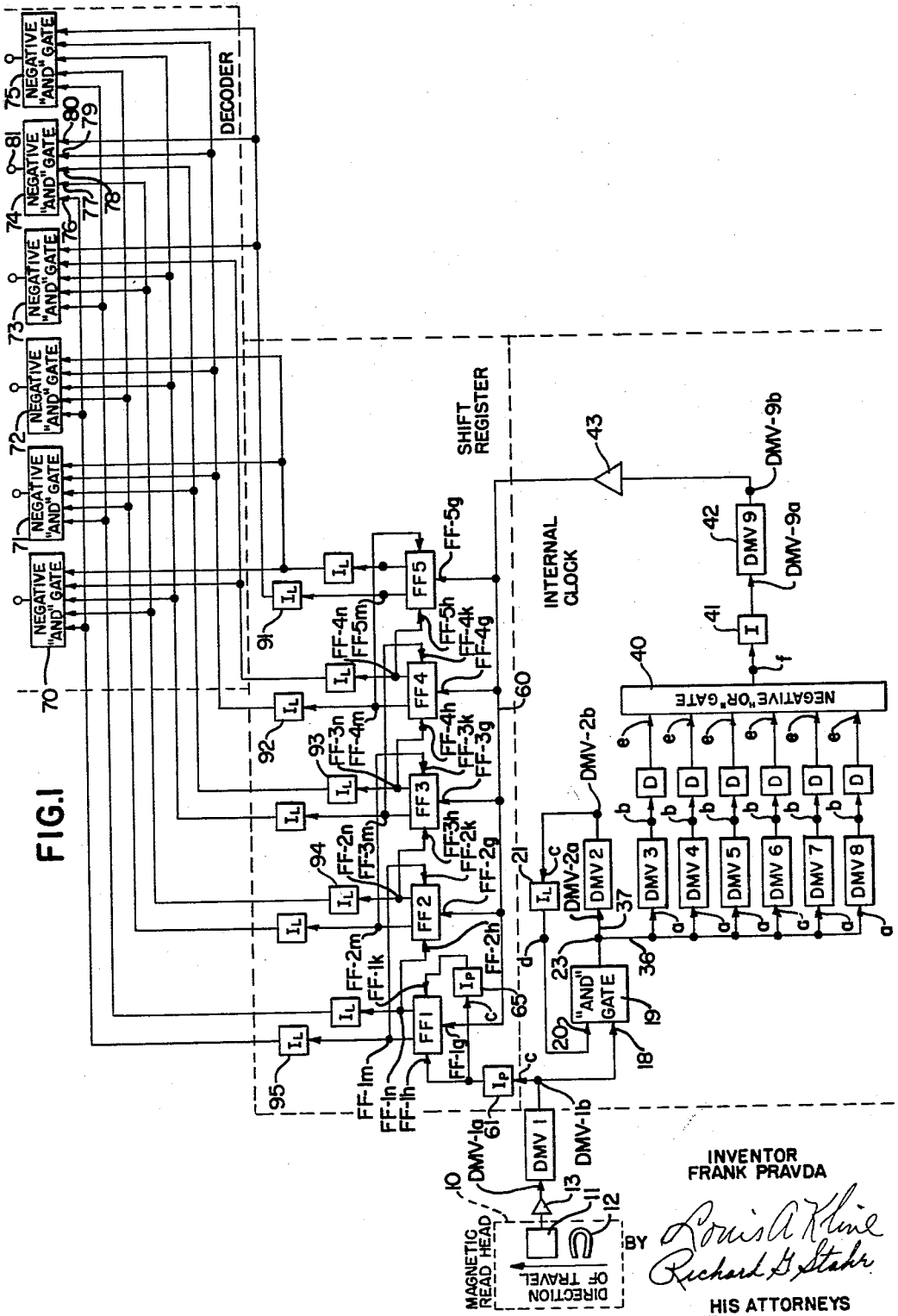

Sept. 15, 1964  F. PRAVDA  3,149,315
AUTOMATIC SENSING SYSTEM
Filed Oct. 9, 1961  4 Sheets-Sheet 2

INVENTOR
FRANK PRAVDA
BY
HIS ATTORNEYS

Sept. 15, 1964    F. PRAVDA    3,149,315
AUTOMATIC SENSING SYSTEM
Filed Oct. 9, 1961    4 Sheets-Sheet 3

INVENTOR
FRANK PRAVDA
BY
HIS ATTORNEYS

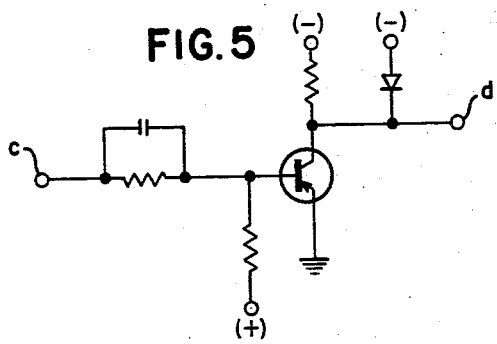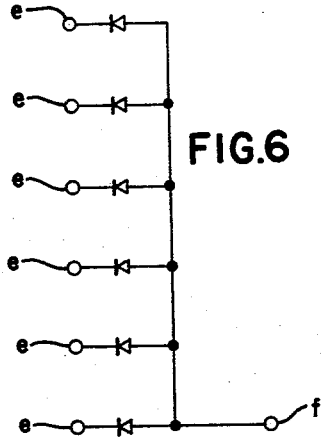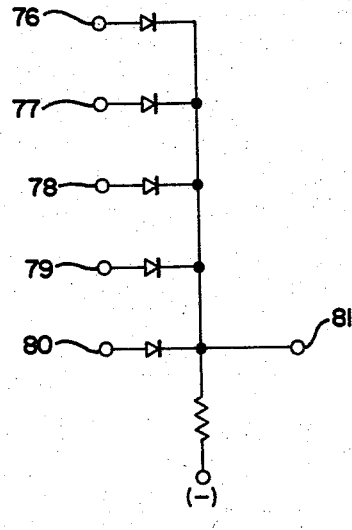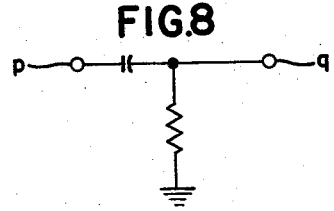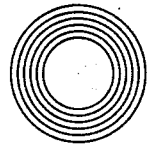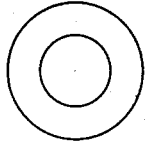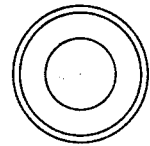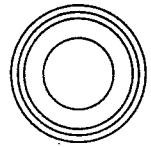

United States Patent Office 3,149,315
Patented Sept. 15, 1964

3,149,315
AUTOMATIC SENSING SYSTEM
Frank Pravda, Stillwater, N.Y., assignor to The National Cash Register Company, Dayton, Ohio, a corporation of Maryland
Filed Oct. 9, 1961, Ser. No. 143,687
6 Claims. (Cl. 340—174.1)

The present invention relates to automatic sensing systems and, more specifically, to systems of this type employing magnetic coding and decoding techniques.

Because developments and improvements in the field of automation are becoming more generally accepted in business and industry, the need for parallel developments and improvements in the area of automatic sensing is becoming increasingly apparent. Considerable attention, therefore, has been directed toward improving automatic sensing methods and techniques in view of the speed and dependability limitations of the equipment and processes heretofore employed. While optical-electrical and radiation sensing techniques have been investigated in this regard, it is believed that the most practical and reliable system of this type lies in the area of magnetic principles.

One of the very serious disadvantages of the current automatic sensing systems and techniques is the very precise positioning of the intelligence-bearing indicia which is required during the sensing operation to realize acceptable reliability.

This invention is directed toward a system and technique which provides acceptable reliability without the very precise positioning requirements of the prior-art arrangements. With the techniques of this invention, the intelligence-bearing indicia is an identifying code arrangement in the form of concentric circles of magnetic material, the sensing position of which may vary over a wide latitude without destroying the system reliability, as will be later described in this specification.

It is, therefore, an object of this invention to provide an improved automatic sensing system.

It is another object of this invention to provide an improved automatic sensing system employing the use of the principles of magnetics.

In accordance with this invention, the intelligence-bearing indicia comprises an identifying code arrangement in the form of concentric circles of a magnetic material which is adapted to be printed on or affixed to each of a group of items to be sensed, and is carried by the items as they are directed through a reading station by a transport mechanism where the code arrangement is first magnetized and then scanned by a suitable magnetic head unit which produces signals characteristic of the code arrangement at present being sensed. With the novel code arrangement and sensing means used, no accurate positioning of the items as they pass the sensing station is required. They may be skewed to any degree relative to their direction of travel past the reading means and still be readable. These characteristic signals are decoded in a suitable electronic circuit network, which presents an output signal upon an output circuit corresponding to the encoded classification.

Figure 2:
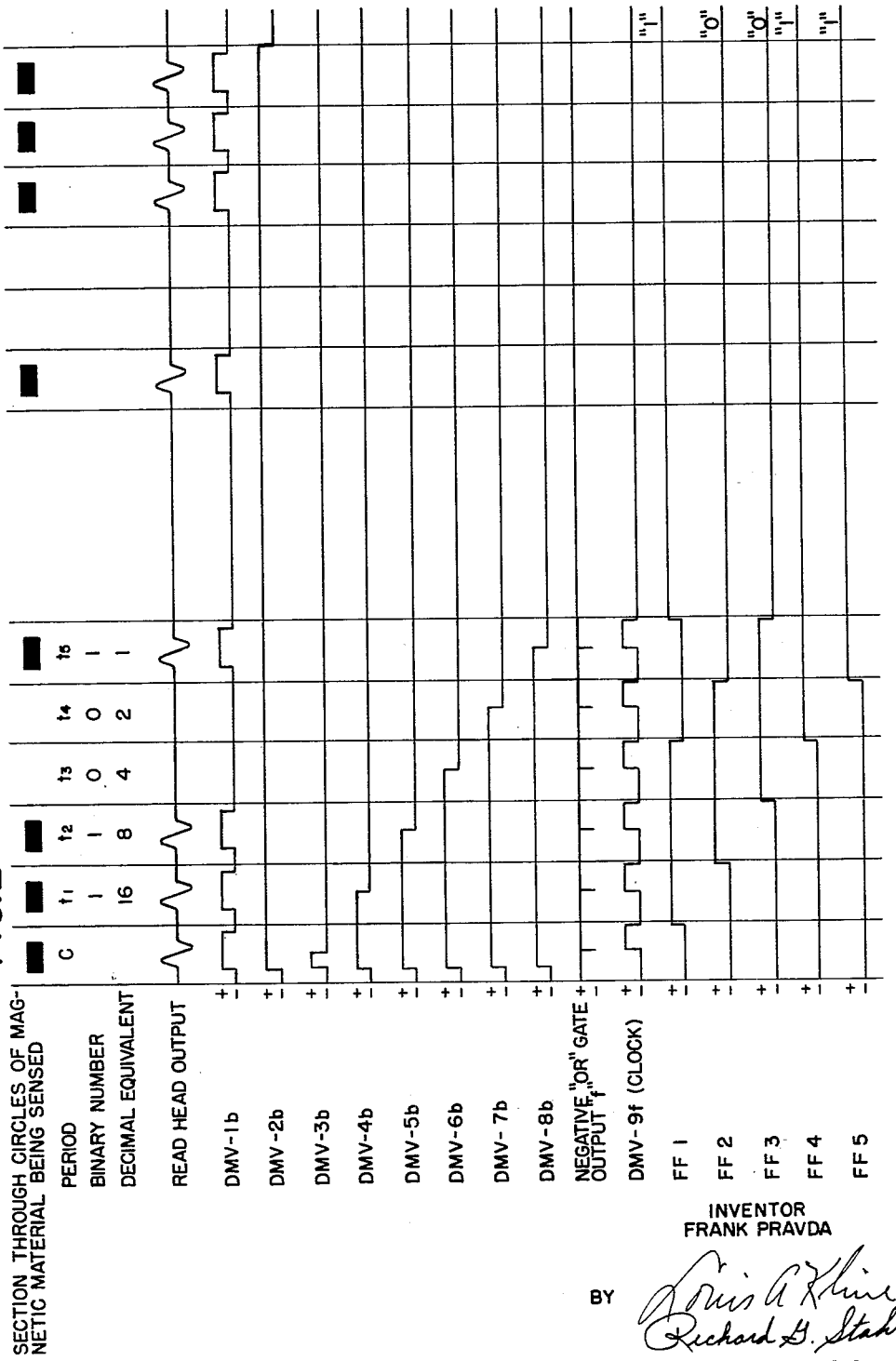
Figure 3:
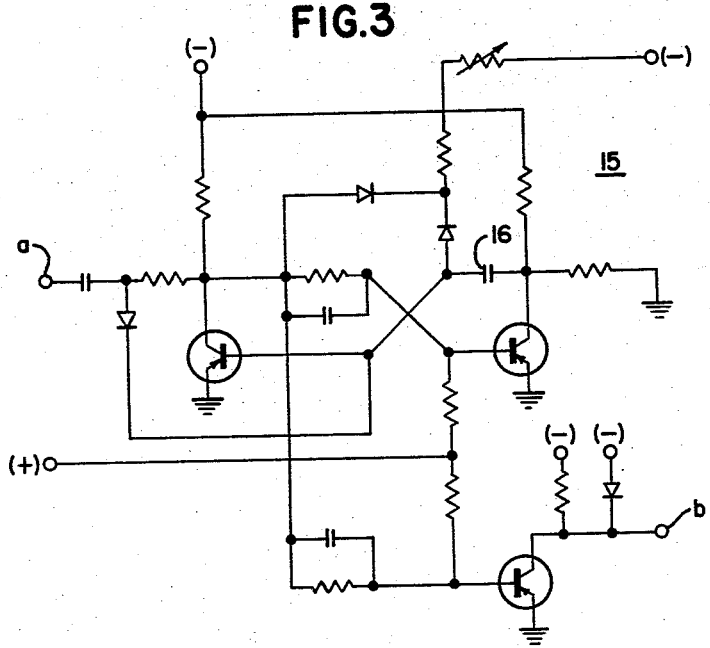
Figure 4:
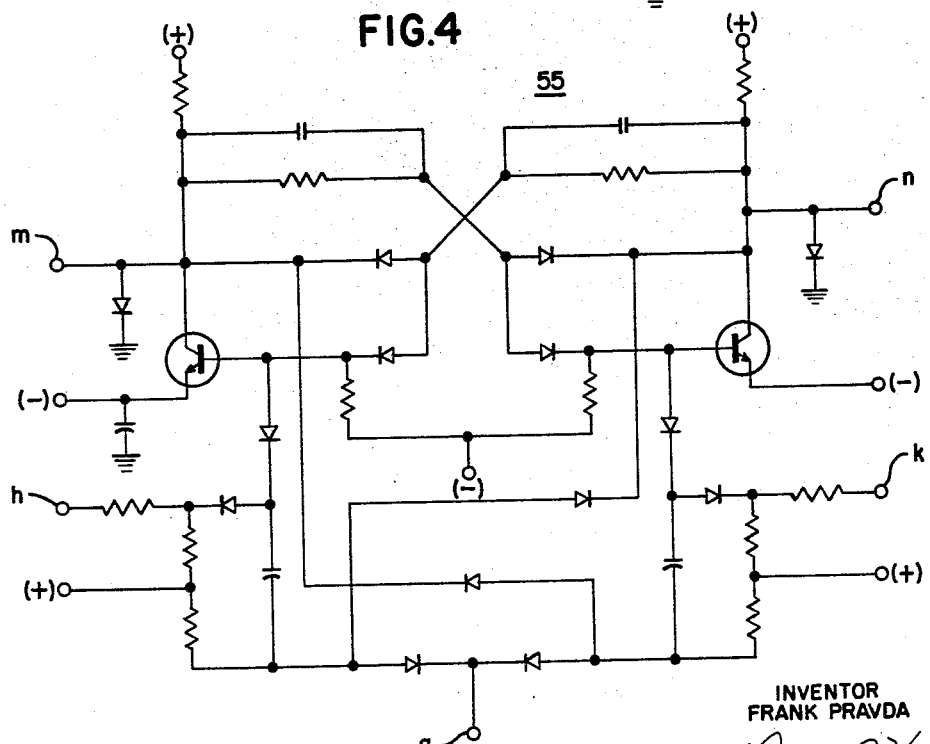

For a better understanding of the present invention, together with further objects, advantages, and features thereof, reference is made to the following description and to the accompanying drawings, in which:

FIGURE 1 is a block diagram indicating the arrangement of the electronic circuitry of this invention, FIGURE 2 is a sequence diagram useful in understanding the operation of the circuitry of FIGURE 1, FIGURE 3 is a schematic diagram of a single-shot or delay multivibrator circuit indicated by certain blocks of FIGURE 1, FIGURE 4 is a schematic diagram of a flip-flop circuit indicated by certain blocks of FIGURE 1, FIGURE 5 is a schematic diagram of an inverter circuit indicated by certain blocks of FIGURE 1, FIGURE 6 is a schematic diagram of a negative "OR" circuit indicated by a block in FIGURE 1 labeled negative "OR" gate, FIGURE 7 is a schematic diagram of a negative "AND" gate circuit indicated by certain of the blocks of FIGURE 1, FIGURE 8 is a schematic diagram of a differentiator circuit indicated by certain of the blocks of FIGURE 1, and FIGURES 9a, 9b, 9c, and 9d illustrate different examples of identifying code arrangements which may be used with this invention.

While the system and techniques of the present invention may be employed with a wide variety of sensing requirements, without intention or inference of a limitation thereto, and for purposes of illustrating the operation of the circuitry of this invention as applied to one specific application, it will be described in this specification in regard to the classification of United States Letter Mail by postage values.

An identifying code arrangement, adapted to be affixed to each of the items to be classified and comprising a first circle and a different combination of smaller concentric circles of a magnetizable material for each class, provides the intelligence employed by the electronic network of this system in the form of characteristic signals for each class. For example, with the application selected for purposes of illustrating this invention, each postage value would constitute a class; therefore, an identifying code arrangement would be provided for each postage value and would provide a characteristic signal for that value.

The first, or outermost, circle, hereinafter identified as the "clock circle," must be present in all of the combinations for the purpose of initiating the action of an internal clock, while the smaller concentric circles may appear in various combinations, each of which is peculiar to a specific classification. FIGURES 9a, 9b, 9c, and 9d illustrate four different combinations of concentric circles which may serve as identifying code arrangements with this invention. FIGURE 9a shows the clock circle and five smaller concentric circles; FIGURE 9b shows the clock circle and a single smaller concentric circle located in the fifth position as counted from the clock circle; FIGURE 9c shows another combination of the clock circle and two smaller concentric circles located in the first and fifth positions as counted from the clock circle; and FIGURE 9d shows still another combination of the clock circle and three smaller concentric circles located in the first, second, and fifth positions as counted from the clock circle. In fact, there are thirty-one different combinations of the clock circle and five smaller concentric circle positions. This arrangement, of course, lends itself admirably to a binary code system wherein each of the smaller concentric circles may correspond to a bit position of a binary code group. With a system for classifying letter mail, for example, the combination of circles selected to designate each class may be arranged to represent, in binary form, the postage value of that class. With combinations of five smaller concentric circles, as illustrated in FIGURES 9a, 9b, 9c, and 9d, all values of postage between one cent and thirty-one cents may be represented without duplication.

When used in this manner, the presence of a concentric circle in any position of the combination designates a "mark" polarity bit of the binary code, while the absence of a concentric circle in any position denotes a "space" polarity bit of the binary code. While either the first concentric circle inside the clock circle or the innermost circle may be selected to be the most significant bit position of the binary code, it will be assumed, for the purpose of explaining the operation of this invention, that the innermost concentric circle represents the least significant bit position and that the concentric circle position immediately next to the clock circle denotes the most significant bit position.

With letter mail, the postage stamps affixed to the several letters may be imprinted with the proper combination of concentric circles of magnestic ink which represents the value of the stamp so imprinted. It is to be specifically understood, however, that, with systems for classifying or sensing other items, the identifying code arrangement of concentric circles may be printed directly upon the items with magnetic ink and need not be imprinted upon a separate tape or a separate tab which may be affixed to the items later.

Assuming for purposes of illustration that a piece of letter mail bearing a postage stamp in the amount of twenty-five cents is being sensed by the circuitry of this invention, FIGURE 9d illustrates the identifying code arrangement of concentric circles which represents the numerical value "25" in binary form, while the top of FIGURE 2 shows this arrangement in cross-section and is labeled "Section Through Printed Circles." Referring to FIGURE 2, it may be noted that the time period during which the outermost circle, or "clock circle," is being sensed is labeled "C," while the time periods during which the remaining concentric circle positions are being sensed are given time period designations $t1$ through $t5$, inclusive. As the binary code representation for the decimal numeral "25" is the appearance of "mark" polarity bits in the first, or most significant, the second, and the fifth bit positions, the corresponding concentric circles of the identifying code arrangement are illustrated as black oblongs in time periods $t1$, $t2$, and $t5$, which correspond to the first second, and fifth bit positions, respectively, of the binary code group. To simplify the binary code indication, "mark" polarity bits are designated by the numeral "1," and "space" polarity bits are designated by the numeral "0." Therefore, in FIGURE 2, under the heading "binary number," the binary code group is designated as 11001, where the "1" in the first bit position corresponds to the decimal value "16," the "1" in the second bit position corresponds to the decimal numeral "8," and the "1" in the fifth bit position corresponds to the decimal numeral "1," for a total of "25," the value of the stamp previously assumed to be sensed for the purpose of explaining the operation of this invention.

As suitable transport mechanisms for directing the letter mail through the reading station are commercially available items well known in the art and form no part of this invention, this device has not been shown in the drawings. It is only necessary that a suitable transport mechanism be provided to direct the lettter mail through the reading station, indicated as a dashed-line rectangle 10 in FIGURE 1 and including a magnetic read head 11 and a magnetizing device 12, in the direction of the arrow, so that the identifying code arrangement is magnetized by the magnetizing device 12 before it is scanned by the read head 11.

The magnetizing device 12 is indicated in FIGURE 1 as a permanent-type magnet. It is to be understood that this is illustrative only, since the magnetizing device may be either an electro-magnet or a permanent magnet. It is only necessary that the magnetizing device be of sufficient width to scan the entire width of the envelope, so that the identifying code arrangement is covered regardless of its position on the envelope. Similarly, the magnetic read head 11 should also be of sufficient width to scan the entire width of the envelope for the same reason. At this time, it may be well to point out that a specific advantage of the identifying code arrangement's being in the form of concentric circles of a magnetizable material is that the arrangement need not be registered accurately with the edges of the article to be classified. Regardless of the degree of skew of the code arrangement relative to the magnetizing device 12 and the magnetic read head 11, the concentric circle arrangement provides a reliable reading.

As the mail is directed through the reading station 10 and the identifying code arrangement of concentric circles is magnetized by the device 12 and read by the magnetic read head 11, the output of the magnetic read head is in the form of an alternating-current wave appearing during the respective time periods that the clock circle, the $t1$ circle, the $t2$ circle, and the $t5$ circle of the identifying code arrangement are sensed, as indicated in FIGURE 2 under the heading "Read Head Output."

The read head output signal are amplified in a conventional amplifier 13, herein indicated in block form, since the details form no part of this invention and may be of any of the several amplifier devices well known in the art. The output signals from the amplifier are applied to the input circuit terminal DMV–1a of a delay multivibrator indicated as a block labeled DMV–1.

The delay multivibrator may be a circuit of conventional design such as that indicated schematically at 15 in FIGURE 3. Delay multivibrators, sometimes termed single-shot multivibrators, are devices of the type which may be triggered, by a correct polarity input pulse, from a first stable state of operation to an alternate state of operation, in which state it remains for a definite period of time, and which, at the conclusion of the time period, reverts spontaneously to its original stable state without the stimulus of an additional input pulse. The time during which a multivibrator of this type remains in its alternate state is determined by the value of the capacitor 16 of FIGURE 3, the greater the capacity the longer the length of time during which the device is in its alternate state. The output at "$b$" varies with the shifting of the states of the delay multivibrator.

The signal pulse produced upon the scanning of the clock circle by the magnetic read head 11 is applied to the input terminal DMV–1a of the multivibrator DMV–1, which serves the dual purpose of shaping the pulse and extending the time during which the data is available for insertion into storage. This signal pulse triggers this device into its alternate state, in which state it remains for a period of time slightly greater than the time required to scan the clock circle but not of sufficient duration to extend into the time period during which the first concentric circle of the combination is being scanned, as indicated by the square wave form labeled DMV–1b of FIGURE 2.

As the delay multivibrator DMV–1 is triggered into its alternate state, the positive-going pulse thereby produced at its output circuit terminal DMV–1b, as shown by the square wave form of FIGURE 2 labeled "DMV–1b," is directed to the input terminal 18 of a conventional "AND" gate 19, herein indicated in block form, as the details form no part of this invention and may be of any one of several well-known types which require that like polarity signals be present upon all of the input circuits to produce an output signal. The other terminal 20 of the "AND" gate 19 is connected to the output terminal "$d$" of an inverter device 21, herein indicated in block form, as it may be a circuit of conventional design, as shown schematically in FIGURE 5, which has its input "$c$" connected to the output terminal DMV–2b of an isolating delay multivibrator DMV–2. This delay multivibrator serves to isolate an internal clock device from any effects of data-representing signals which are read by the head 11, in a manner to be later explained in detail in this specification. The delay multivibrator DMV–2 also may be a circuit of conventional design, as indicated schematically in FIGURE 3, and, therefore, its output terminal has been identified by the same reference numeral "$b$" as has the output terminal of FIGURE 3. Assuming that the delay multivibrator DMV-2 is in its first stable state of operation, the polarity of the signal present upon its output terminal is negative, as shown by the square wave of FIGURE 1 labeled "DMV-2b." This negative signal is inverted in the inverter circuit 21 and presented to the input terminal 20 of the "AND" gate 19 as a positive polarity signal. The presence of this positive polarity signal upon the terminal 20 and the positive polarity signal from the delay multivibrator DMV-1 upon the terminal 13 results in a positive polarity signal upon the output terminal 23 of the "AND" gate 19.

The output terminal 23 of the gate 19 is connected through a bus 36 to all of the input terminals "a" of the delay multivibrators DMV-3, DMV-4, DMV-5, DMV-6, DMV-7, and DMV-8, which constitute a portion of an internal clock, and, through a lead 37, to the input terminal DMV-1a of the isolating delay multivibrator DMV-2. These delay multivibrators also have been shown in block form, and each may be a circuit of conventional design, as illustrated schematically in FIGURE 3.

The signal present upon the output terminal 23 of the gate 19, produced as the magnetic read head 11 scanned the clock circle of the identifying code group, triggers all of the delay multivibrators DMV-3 through DMV-8, and the isolating delay multivibrator DMV-2, into their alternate states, as shown in FIGURE 2 by the square waves labeled "DMV-3b," "DMV-4b," "DMV-5b," "DMV-6b," "DMV-7b," "DMV-8b," and "DMV-2b," respectively.

The capacitor in each of the delay multivibrators DMV-3 through DMV-8, which corresponds to the capacitor 16 of FIGURE 3, is chosen to be of sufficient capacity to permit these delay multivibrators to return to their normal stable state in consecutive order and each delayed from the next preceding one by a period of time required to scan the successive concentric circles, as graphically illustrated in FIGURE 2, where the square wave labeled "DMV-3b" corresponds to the delay multivibrator DMV-3, the square wave labeled "DMV-4b" corresponds to the delay multivibrator DMV-4, the square wave form labeled "DMV-5b" corresponds to the delay multivibrator DMV-5, etc., through the square wave labeled "DMV-8b," corresponding to the delay multivibrator DMV-8.

As each of these delay multivibrators DMV-3 to DMV-8, inclusive, returns to its normal stable state, the negative-going pulse resulting from the return is applied to an input "e" of a negative "OR" gate 40, herein shown in block form but detailed schematically in FIGURE 6, and appears at its output "f" as an extremely-short-duration pulse, as graphically illustrated in FIGURE 2 by the curve labeled "Negative 'OR' gate output 'f'." These short-duration pulses are later employed as clock pulses, as will be explained hereinafter. As the delay multivibrators DMV-3 to DMV-8, inclusive, are the devices which produce the clock pulses, it is necessary that each device return to its normal stable state during the corresponding time period. The delay time designed into each of these clock multivibrators is, of course, dictated by the linear velocity of the letter mail through the reading station 10. As this velocity may be selected arbitrarily, no specific times will be specified herein, as it is a very simple matter to determine the delay time required to produce the necessary clock pulses through this series of delay multivibrators when the feed velocity is selected.

The capacitor of the delay multivibrator DMV-2, which corresponds to the capacitor 16 of the circuit diagram of FIGURE 3, is arranged to be of sufficient value to maintain the delay multivibrator DMV-2 in its alternate state during a period of time great enough for the entire identifying code concentric circle group to be scanned by the magnetic read head 11, as indicated in FIGURE 2 by the square wave form labeled "DMV-2b." The positive polarity signal present at the output terminal "b" of the delay multivibrator DMV-2 when it is in its alternate state is converted to a negative polarity signal in the inverter circuit 21 and is applied to the input terminal 20 of the gate 19, thereby closing the gate 19. With the gate 19 closed, the passage of any additional signals therethrough is prevented until the delay multivibrator DMV-2 has returned to its original stable state. This is necessary to isolate the delay multivibrators DMV-2, DMV-3, DMV-4, DMV-5, DMV-6, DMV-7, and DMV-8 from the magnetic head unit 11 to prevent them from being triggered to their alternate state with each signal received through the delay multivibrator DMV-1.

The short-duration negative pulses which appear at the output circuit "f" of the negative "OR" gate 40, as the delay multivibrators DMV-3 through DMV-8 consecutively return to their original, or stable, operating states, are applied through an inverter circuit 41, which may be of a type schematically illustrated in FIGURE 5, where the negative polarity pulses are converted to positive polarity pulses and applied to the input circuit DMV-9a of a clock delay multivibrator DMV-9. As with the other delay multivibrators hereinbefore discussed, the clock multivibrator DMV-9 may be a circuit of conventional design, as schematically illustrated in FIGURE 3. The capacitor in the clock multivibrator DMV-9, which corresponds to the capacitor 16 of FIGURE 3, is chosen to be of sufficient capacity to shape and lengthen the clock pulses sufficiently to trigger the flip-flops FF1 through FF5 during the several time intervals, as indicated in FIGURE 2 by the square wave labeled "DMV-9b." The output of the clock multivibrator DMV-9 is applied through a conventional amplifier 43, herein indicated in block form, since the details form no part of the invention and may be of any one of the several well-known amplifier circuits, to the input circuits "g" of respective flip-flop devices FF1, FF2, FF3, FF4, and FF5. These flip-flop circuits have herein been indicated in block form but may be of conventional circuit design, as detailed schematically at 55 in FIGURE 4. Flip-flop circuits of this type are multivibrator devices having two stable states of operation, into which the devices may be alternately triggered through the application of successive signals to the input circuit "g" in the presence of negative enabling signals at input terminals "h" or "k."

As illustrated in FIGURE 1, these flip-flop circuits are connected in the form of a shift register circuit which is utilized as a temporary storage device for receiving and storing the signals produced upon the sensing of the concentric circles of the identifying code arrangement by the magnetic read head 11. The operation of shift register circuits is well known and may be summed up by pointing out that the state of operation of any of the stages may be successively stepped along to the next stage through the application of shift pulses, in this instance the clock pulses emanating from the clock multivibrator DMV-9, applied simultaneously to all of the input terminals FF1g to FF5g through a bus 60.

With the flip-flop circuit of FIGURE 4 in the initial, or "1," state, a positive polarity signal is present upon output terminal "m," and a negative polarity signal is present upon output terminal "n;" and, with this circuit in the alternate, or "0," state, a negative polarity signal is present upon output terminal "m," and a positive polarity signal is present upon output terminal "n." To trigger this device from the "1" state to the "0" state, a negative polarity signal must be present upon input terminal "h" coincident with a negative-going shift or clock pulse presented to input terminal "g;" and, to trigger this device from the "0" state to the "1" state, a negative polarity signal must be present upon input terminal "k" coincident with a negative-going shift or clock pulse presented to input terminal "g."

Assuming that all of the flip-flops FF1 through FF5, inclusive, are in the alternate, or "0," stable state, the positive signal present upon the output terminal DMV-1b of the delay multivibrator DMV-1, produced as this device is triggered to its alternate state by the signal produced as the magnetic read head scans the clock circle of the identifying code group, is applied through an inverter circuit 61, similar to that schematically illustrated in FIGURE 5, as a negative polarity signal to the input terminal FF1h of the flip-flop FF1 coincident with the initial clock pulse produced by the clock multivibrator DMV-9, as indicated by wave form "DMV-9b" in FIGURE 2. The negative polarity signal present upon the output of the inverter 61 is also applied to the input terminal "c" of an inverter 65, through which it is re-inverted to a positive polarity signal. This positive polarity signal, which is applied to the input terminal FF1k of flip-flop FF1, does not affect the operation of the flip-flop FF1. As the square wave clock pulse goes negative upon the return of the clock multivibrator DMV-9 to its normal, stable, state, as indicated by the square wave labeled "DMV-9b" in FIGURE 2, the flip-flop FF1 is triggered to the "1" stable state, as indicated by the square wave labeled "FF1" in FIGURE 2, thereby resulting in a positive polarity signal upon the output terminal FF1m and a negative polarity signal upon the output terminal FF1n thereof.

During the next time interval, t1, the next concentric circle, corresponding to the bit position of the binary code representation designating the numerical value "16," is scanned by the magnetic read head 11 and transmitted through the amplifier 13 to the input terminal DMV-1a of the delay multivibrator DMV-1. The signal triggers the delay multivibrator DMV-1 to its alternate state, as shown in time period t1 of the square wave labeled "DMV-1b" in FIGURE 2, in which state it remains until near the end of time period t1, as indicated. This square wave output from the delay multivibrator DMV-1 is prevented from passing through the "AND" gate 19 and re-triggering the clock multivibrators DMV-3 through DMV-8, because the isolating multivibrator DMV-2 is still in its alternate state, thereby applying a negative polarity signal to the other terminal 20, as previously described. However, this signal is applied through the inverter 61 as a negative polarity sign to the input terminal FF1h of the flip-flop FF1 coincident with the clock pulse produced by the clock multivibrator DMV-9 during time period t1, as indicated by the square wave labeled "DMV-9b" in FIGURE 2. As the clock pulse goes negative upon the return of the clock multivibrator DMV-9 to its original, stable, state at the end of time period t1, as indicated in time period t1 of the wave form labeled "DMV-9b" in FIGURE 2, the flip-flop FF1 is maintained in the "1" state because of the presence of the negative signal on the input terminal FF1h thereof, and the flip-flop FF2 is triggered to the "1" state because of the negative signal present upon its input circuit FF2h from the output circuit FF1n of the flip-flop FF1, as indicated by the square wave form labeled "FF2" in FIGURE 2. This results in a positive polarity signal on output terminal FF2m and a negative polarity signal on output terminal FF2n of flip-flop FF2.

As the identifying code arrangement is directed through the reading station, the next concentric circle, which appears during time period t2, is scanned by the magnetic head 11 and applied to the delay multivibrator DMV-1, thereby triggering it to its alternate state, as shown in time period t2 of the square wave labeled "DMV-1b" in FIGURE 2, in which state it remains until near the end of time period t2, as illustrated. This signal from the delay multivibrator DMV-1 is applied through the inverter 61 as a negative polarity signal to the input circuit FF1h of the flip-flop FF1 coincident with the clock pulse produced by the clock multivibrator DMV-9 during time period t2, as indicated by the square wave labeled "DMV-9b" in FIGURE 2. As the clock pulse goes negative upon the return of the clock multivibrator DMV-9 to its original, stable, state at the end of time period t2, as indicated in time period t2 of the wave form labeled "DMV-9b" in FIGURE 2, the flip-flops FF1 and FF2 are maintained in the "1" state by the negative polarity input signals present upon their input terminals FF1h and FF2h from the delay multivibrator DMV-1 through the inverter 61 and the output terminal FF1n of the flip-flop FF1, respectively, and the negative polarity signal present upon the input terminal FF3h of the flip-flop FF3 from the output terminal FF2n of flip-flop FF2 permits flip-flop FF3 to be triggered to the "1" state, as indicated by the square wave labeled "FF3" in FIGURE 2. At this time, a positive polarity signal is present upon output terminal FF3m, and a negative polarity signal is present on output terminal FF3n of flip-flop FF3.

As this particular identifying code arrangement is directed further through the reading station, there is no concentric circle section to be sensed during time period t3; therefore there is no input signal directed to delay multivibrator DMV-1 from the magnetic read head 11, and the polarity of the signal at output terminal DMV-1b thereof remains negative. This negative signal is inverted to a positive polarity by the inverter 61, and the positive output of the inverter 61 is further inverted into a negative polarity signal by the inverter 65. This negative polarity signal is presented to input terminal FF1k of flip-flop FF1. As the clock pulse goes negative upon the return of clock multivibrator DMV-9 to its original, stable, state at the end of time period t3, as indicated in time period t3 of the wave from labeled "DMV-9b" in FIGURE 2, flip-flop FF1 is triggered to the "0" state because of the negative polarity signal at the input terminal FF1k thereof; the negative polarity signal present upon input terminal FF2h of flip-flop FF2 from output terminal FF1n of flip-flop FF1, before it is triggered by the clock, maintains flip-flop FF2 in the "1" state; the negative polarity signal present upon input terminal FF3h of flip-flop FF3 from output terminal FF2n of flip-flop FF2 maintains flip-flop FF3 in the "1" state; and the negative polarity signal present upon input terminal FF4h of flip-flop FF4 from output terminal FF3n of flip-flop FF3 permits flip-flop FF4 to be triggered to the "1" state, as indicated by the square wave labeled "FF4" in FIGURE 2.

As there is no ring to be sensed during time period t4 as the identfying code arrangement is directed further through the reading station 10, the delay multivibrator DMV-1 is maintained in its original state, and the polarity of the signal appearing at its output terminal DMV-1b is negative. This negative signal is twice inverted through the inverters 61 and 65 and is presented as a negative polarity signal to input terminal FF1k of flip-flop FF1. As the clock pulse goes negative at the end of time period t4, as indicated in time period t4 of the wave labeled "DMV-9b" in FIGURE 2, flip-flop FF1 is maintained in the "0" state because of the negative potential signal present upon its input terminal FF1k; the negative polarity signal present upon input terminal FF2k of flip-flop FF2 from output terminal FF1m of flip-flop FF1 permits flip-flop FF2 to be triggered to the "0" state; the negative polarity signal present upon input terminal FF3h of flip-flop FF3 from output terminal FF2n of flip-flop FF2 before it is triggered by the clock pulse maintains flip-flop FF3 in the "1" state; the negative polarity signal present upon input terminal FF4h of flip-flop FF4 from output terminal FF3n of flip-flop FF3 maintains flip-flop FF4 in the "1" state; and the negative potential signal present upon input terminal FF5h of flip-flop FF5 from output terminal FF4n of flip-flop FF4 permits flip-flop FF5 to be triggered to the "1" state, as indicated by the square wave labeled "FF5" in FIGURE 2.

As this particular identifying code arrangement is directed further through the reading station, the magnetic concentric circle which passes the read head during time period *t5* is sensed by the magnetic head 11, and the resulting signal is applied to the delay multivibrator DMV–1 through the amplifier 13, thereby triggering the delay multivibrator DMV–1 to its alternate state, as shown in time period *t5* of the square wave labeled "DMV–1*b*" in FIGURE 2. The positive polarity signal now present upon output terminal DMV–1*b* of delay multivibrator DMV–1 is inverted by the inverter circuit 61 and presented as a negative polarity signal to input terminal FF1*h* of flip-flop FF1. As the clock pulse goes negative at the end of time period *t5*, as shown in time period *t5* of the wave form labeled "DMV–9*b*" in FIGURE 2, flip-flop FF1 is triggered to the "1" state; the negative polarity signal present upon input terminal FF2*k* of flip-flop FF2 from output terminal FF1*m* of flip-flop FF1 maintains flip-flop FF2 in the "0" state; the negative polarity signal present upon input terminal FF3*k* of flip-flop FF3 from output terminal FF2*m* of flip-flop FF2 permits flip-flop FF3 to be triggered to the "0" state; the negative polarity signal present upon input terminal FF4*h* of flip-flop FF4 from output terminal FF3*n* of flip-flop FF3 maintains flip-flop FF3 in the "1" state; and the negative signal present upon terminal FF5*h* of flip-flop FF5 from output terminal FF4*m* of flip-flop FF4 maintains flip-flop FF5 in the "1" state.

With flip-flops FF1, FF4, annd FF5 in the "1" state and flip-flops FF2 and FF3 in the "0" state, the binary representation 10011, the binary code representative of the circles of the identifying group, is temporarily stored in the shift register comprising flip-flops FF1 through FF5.

The respective output circuits of flip-flops FF1 through FF5 of the shift register arrangement are applied to and decoded by a series of negative "AND" gates 70, 71, 72, 73, 74, and 75, which are herein indicated in block form but which may be of conventional circuitry as shown schematically in FIGURE 7. In the interest of reducing drawing complexity, only six negative "AND" gates have been herein indicated in FIGURE 1 and correspond to the numerical values, 5, 10, 15, 20, 25, and 30, respectively. It is pointed out, however, that the intermediate values 1 through 31 can easily be obtained by correctly wiring the output of the flip-flops to additional negative "AND" gates for each numerical value required.

As the number assumed to be read was 25, it is necessary that all of the input circuits 76, 77, 78, 79, and 80 of the "AND" gate 74 be of a negative polarity to get a negative polarity output signal upon the output terminal 81 thereof. Tracing these input circuit leads back to the flip-flops of the shift register arrangement, input circuit 80 is brought back to output terminal FF5*m* of flip-flop FF5, which, since flip-flop FF5 is in the "1" state, is of a positive polarity. As this signal is inverted by the inverter circuit 91, input circuit 80 of negative "AND" gate 74 is negative. Input circuit 79 is returned to output terminal FF4*m* of flip-flop FF4, which, since flip-flop FF4 is in the "1" state, is of a positive polarity. As this signal is inverted by inverter circuit 92, input circuit 79 of negative "AND" gate 74 is negative. Input circuit 78 is returned to output terminal FF3*n* of flip-flop FF3, which, since flip-flop FF3 is in the "0" state, is of a positive polarity. As this signal is inverted by inverter circuit 93, input circuit 78 of negative "AND" gate 74 is negative. Input circuit 77 is returned to output terminal FF2*n* of flip-flop FF2, which, since flip-flop FF2 is in the "0" state, is of a positive polarity. As this signal is inverted by inverter circuit 94, input circuit 77 of negative "AND" gate 74 is negative. Input circuit 76 is returned to output terminal FF1*m* of flip-flop FF1, which, since flip-flop FF1 is in the "1" state, is of a positive polarity. As this signal is inverted by inverter circuit 95, input circuit 77 of negative "AND" gate 74 is negative. The presence of a negative signal on each of input circuits 76, 77, 78, 79, and 80 of negative "AND" gate 74 results in a negative output signal on output circuit 81 thereof. This negative polarity signal may be utilized by a classification utilization device, not shown.

If the input circuits to each and every one of the remaining negative "AND" gates 70, 71, 72, 73, and 75 be traced back to the shift register flip-flops, it would develop that none of these devices would have negative polarity signals present at all of the input circuit terminals; therefore, there would be no output signal present upon the output circuits thereof.

The output signal thus produced on the specific negative "AND" gate as decoded from the temporary shift register storage may be used by an external classification device which, since it forms no part of this invention, has not been shown.

While a preferred form or embodiment of the present invention has been shown and described, it will be obvious to those skilled in the art that various modifications and substitutions may be made without departing from the spirit of the invention, which is to be limited only within the scope of the appended claims.

What is claimed is:

1. In an automatic system for sensing a plurality of items, the combination, with a reading station and a transport means for directing the items to be sensed through said station, of an identifying code arrangement on each of the items to be sensed comprising a first circle and a different combination of smaller concentric circles of a sensible material for each class, a sensing means located at said reading station in position to scan the said identifying code arrangement on each item as said items are directed through said reading station, an internal clock initiated by the signal produced upon the sensing of any portion of said first circle by said sensing means, a temporary storage means conditioned to receive data upon the initiation of said internal clock and timed in its operation thereby for receiving and storing the signals produced upon the sensing of any portion of any of said smaller concentric circles, and decoding circuit means controlled by said storage means, the output of said decoding circuit means providing signals for a utilization device.

2. In an automatic system for sensing a plurality of items, the combination with a reading station and a transport means for directing the items to be sensed through said station; of an identifying code arrangement on each of the items to be sensed comprising a first circle and a different combination of smaller concentric circles of a magnetizable material for each class, a magnetic sensing means located at said reading station in position to scan the said identifying code arrangement on each item as said items are directed through said reading station, magnetizing means located relative to said magnetic sensing means whereby said identifying code arrangement is magnetized before passing said magnetic sensing means, an internal clock initiated by the signal produced upon the sensing of any portion of said first circle by said magnetic sensing means, a temporary storage means conditioned to receive data upon the initiation of said internal clock and timed in its operation thereby for receiving and storing the signals produced upon the sensing of any portion of any of said smaller concentric circles, and decoding circuit means controlled by said storage means, the output of said decoding means providing signals for a utilization device.

3. In an automatic system for sensing a plurality of items, the combination, with a reading station and a transport means for directing the items to be sensed through said station, of an identifying code arrangement on each of the items to be sensed comprising a first circle and a different combination of smaller concentric circles of a magnetizable material for each class, a magnetic sensing means located at said reading station in position

11 to scan the said identifying code ararngement on each item as said items are directed through said reading station, magnetizing means located relative to said magnetic sensing means whereby said identifying code arrangement is magnetized before passing said magnetic sensing means, an internal clock initiated by the signal produced upon the sensing of any portion of said first circle by said magnetic sensing means, means for isolating said internal clock from said magnetic sensing means after being initiated, a temporary storage means conditioned to receive data upon the initiation of said internal clock and timed in its operation thereby for receiving and storing the signals produced upon the sensing of any portion of any of said smaller concentric circles, and decoding circuit means controlled by said storage means, the output of said decoding circuit means providing signals for a utilization device.

4. In an automatic system for sensing a plurality of items, the combination, with a reading station and a transport means for directing the items to be sensed through said station, of an identifying code arrangement on each of the items to be sensed comprising a first circle and a different combiantion of smaller concentric circles of a magnetizable material for each class, a magnetic sensing means located at said reading station in position to scan the said identifying code arrangement on each item as said items are directed through said reading station, magnetizing means located relative to said magnetic sensing means whereby said identifying code arrangement is magnetized before passing said magnetic sensing means, an internal clock initiated by the signal produced upon the sensing of any portion of said first circle by said magnetic sensing means, means for isolating said internal clock from said magnetic sensing means after being initiated, a shift register circuit conditioned to receive data upon the initiation of said internal clock and timed in its operation thereby for receiving and storing the signals produced upon the sensing of any portion of any of said smaller concentric circles, and decoding circuit means controlled by said shift register circuit, the output of said decoding circuit means providing signals for a utilization device.

5. In an automatic system for sensing a plurality of items without regard to the orientation of the items, the combination, with a reading station and a transport means for directing the items to be sensed through said station, of an identifying code arrangement on each of the items to be sensed comprising a first circle and a different combination of smaller concentric circles of a magnetizable material for each class, a magnetic sensing means located at said reading station in position to scan the said identifying code arrangement on each item as said items are directed through said reading station, magnetizing means located relative to said magnetic sensing means whereby said identifying code arrangement is magnetized before passing said magnetic sensing means, an internal clock initiated by the signal produced upon the sensing of any portion of said first circle by said magnetic sensing means, means for isolating said internal clock from said magnetic sensing means after being initiated, a shift register circuit conditioned to receive data upon the initiation of said internal clock and timed in its operation thereby for receiving and storing the signals produced upon the sensing of any portion of any of said smaller concentric circles, and decoding circuit means comprising a negative "OR" circuit for each class, controlled by said shift register circuit, the output of said negative "OR" circuit providing signals for a utilization device.

6. In a system for classifying a plurality of items, the combination, with a decoding station and a transport means for directing the items to be classified through said station, of an identifying code arrangement on each of the items to be classified comprising a first circle and a different combination of smaller concentric circles of a magnetizable material for each class, a magnetic read head located at said decoding station in position to scan the said identifying code arrangement on each item as said items are directed through said decoding station whereby said sensing means is capable of correctly reading the data of the code arrangement in any position of the item as it passes the decoding station, magnetizing means located relative to said magnetic read head whereby said identifying code arrangement is magnetized before passing said magnetic read head, an internal clock arrangement initiated by the signal produced upon the sensing of any portion of said first circle by said magnetic read head, delay multivibrator means for isolating said internal clock from said magnetic read head after being initiated, a shift register circuit conditioned to receive data upon the initiation of said internal clock and timed in its operation thereby for receiving and storing the signals produced upon the sensing of any portion of said smaller concentric circles, and decoding circuit means comprising a negative "OR" gate for each class controlled by said shift register circuit, the output of said negative "OR" gates providing signals for a utilization device.

References Cited in the file of this patent

UNITED STATES PATENTS

| | | |
|---|---|---|
| 3,000,000 | Eldredge | Sept. 12, 1961 |
| 3,025,053 | Perry | Mar. 13, 1962 |
| 3,052,874 | Krakinowski et al. | Sept. 4, 1962 |